(12) United States Patent
Almasi et al.

(10) Patent No.: US 10,848,204 B2
(45) Date of Patent: Nov. 24, 2020

(54) RECONFIGURABLE ANTENNA MULTIPLE ACCESS FOR MILLIMETER WAVE SYSTEMS

(71) Applicant: BOISE STATE UNIVERSITY, Boise, ID (US)

(72) Inventors: Mojtaba Ahmadi Almasi, Boise, ID (US); Hani Mehrpouyan, Boise, ID (US)

(73) Assignee: BOISE STATE UNIVERSITY, Boise, ID (US)

( * ) Notice: Subject to any disclaimer, the term of this patent is extended or adjusted under 35 U.S.C. 154(b) by 0 days.

(21) Appl. No.: 16/209,350

(22) Filed: Dec. 4, 2018

(65) Prior Publication Data
US 2019/0356359 A1 Nov. 21, 2019

Related U.S. Application Data

(60) Provisional application No. 62/674,293, filed on May 21, 2018.

(51) Int. Cl.
*H04B 7/024* (2017.01)
*H01Q 1/36* (2006.01)
*H01Q 1/24* (2006.01)

(52) U.S. Cl.
CPC ............. *H04B 7/024* (2013.01); *H01Q 1/241* (2013.01); *H01Q 1/36* (2013.01)

(58) Field of Classification Search
None
See application file for complete search history.

(56) References Cited

U.S. PATENT DOCUMENTS

| | | | |
|---|---|---|---|
| 8,824,606 B2 * | 9/2014 | Cheng | H04L 27/16 375/343 |
| 2008/0048921 A1 * | 2/2008 | Rebeiz | H01Q 1/3233 343/754 |
| 2011/0175791 A1 * | 7/2011 | Ozdemir | H01Q 1/00 343/876 |
| 2016/0197660 A1 * | 7/2016 | O'Keeffe | H01Q 1/246 370/329 |
| 2019/0081693 A1 * | 3/2019 | Eitan et al. | H04B 7/0874 |
| 2019/0267710 A1 * | 8/2019 | Jenwatanavet | H01Q 9/0407 |

OTHER PUBLICATIONS

Nutaq, "Alamouti Space-Time Block Coding", Feb. 14, 2016, Nutaq Innovations, pp. 1-11 (Year: 2016).*

* cited by examiner

*Primary Examiner* — Steve R Young
(74) *Attorney, Agent, or Firm* — Parsons Behle & Latimer

(57) ABSTRACT

A system may include a radio frequency chain configured to process a signal. The system may further include a reconfigurable antenna including multiple antenna feeds, each of the antenna feeds associated with a beam direction. The system may also include a beam selection network configured to couple the radio frequency chain to a first antenna feed of the multiple antenna feeds to generate a first beam in a first direction, and simultaneously couple the radio frequency chain to a second antenna feed of the multiple antenna feeds to generate a second beam in a second direction.

6 Claims, 7 Drawing Sheets

RECONFIGURABLE ANTENNA MULTIPLE ACCESS FOR MILLIMETER WAVE SYSTEMS

CROSS-REFERENCE TO RELATED APPLICATIONS

This disclosure claims priority to and the benefit of U.S. Provisional Patent Application No. 62/674,293, filed on May 21, 2018 and entitled "Reconfigurable Antennas in MM Wave MIMO Systems," the contents of which are hereby incorporated by reference herein in their entirety.

GOVERNMENT LICENSE RIGHTS

This invention was made with government support under NSF Award No. 1642865. The government has certain rights in the invention.

FIELD OF THE DISCLOSURE

This disclosure is generally related to reconfigurable antennas, and, in particular, to multiple access millimeter wave antenna systems.

BACKGROUND

Millimeter-wave communications (e.g., within a 30-300 GHz range) may become an important part of 5th generation (5G) technologies. In order to communicate with multiple user devices, typical millimeter-wave communication systems may rely on non-orthogonal multiple access techniques to enhance spectral efficiency. While orthogonal multiple access techniques are performed in one of the time domain, the frequency domain, or the code domain, non-orthogonal multiple access techniques are performed in the power domain. As such, non-orthogonal multiple access techniques may result in more complex hardware at a receiving device, which may be prohibitive for 5G systems.

Further, reconfigurable antennas may enable the formation of multiple steerable beams. However, when non-orthogonal multiple access techniques are applied to reconfigurable antennas, the system may exhibit a reduced achievable data transfer rate due to power division among the beams. As such, when taking into account limitations in radio frequency circuitry and the division of transmitted power between multiple access beams, typical millimeter-wave non-orthogonal multiple access systems do not operate efficiently. Other disadvantages may exist.

SUMMARY

Disclosed is a reconfigurable antenna multiple access system that overcomes at least one of the described disadvantages of typical non-orthogonal multiple access systems. In an embodiment, a system includes a single radio frequency chain that upconverts only one signal of multiple signals intended for multiple user devices. The radio frequency chain is coupled to a reconfigurable antenna that includes multiple antenna feeds to form multiple radiation beams. The upconverted signal is transmitted through at least one of the multiple radiation beams. The system further compares a phase of the first signal to a phase of a second signal and shifts the phase at an antenna feed associated with a second beam. As such, the second signal is regenerated from the first signal at the antenna feed and is transmitted through at least a second radiation beam of the multiple radiation beams.

In an embodiment, a system includes a radio frequency chain configured to process a signal. The system further includes a reconfigurable antenna including multiple antenna feeds, each of the antenna feeds associated with a beam direction. The system also includes a beam selection network configured to couple the radio frequency chain to a first antenna feed of the multiple antenna feeds to generate a first beam in a first direction, and simultaneously couple the radio frequency chain to a second antenna feed of the multiple antenna feeds to generate a second beam in a second direction.

In some embodiments, the multiple antenna feeds are tapered slot antenna feeds. In some embodiments, the system further includes a spherical dielectric lens coupled to the tapered slot antenna feeds. In some embodiments, the reconfigurable antenna includes a plurality of active antenna elements and a plurality of passive antenna elements. In some embodiments, each antenna feed of the multiple antenna feeds is independently controllable to modify a phase of the signal received at the antenna feed. In some embodiments, the system includes a phase detector configured to determine a phase difference between the signal and a second signal. In some embodiments, the system includes a processing circuit configured to allocate a first power level to the first beam and to allocate a second power level to the second beam. In some embodiments, the radio frequency chain is configured to down-convert the signal when the signal is received from a remote device, or up-convert the signal when the signal is to be sent to the remote device. In some embodiments, the beam selection network is further configured to couple the radio frequency chain to at least one additional antenna feed of the multiple antenna feeds to generate at least one additional beam in an additional direction.

In an embodiment, a method includes processing a signal at a first radio frequency chain. The method further includes routing a first signal component between the first radio frequency chain and a first antenna feed of a first reconfigurable antenna to generate a first beam in a first direction, and simultaneously routing the first signal component between the first radio frequency chain and a second antenna feed of the first reconfigurable antenna to generate a second beam in a second direction.

In some embodiments, the method includes, at a first time allocation, transmitting or receiving the first signal component via the first reconfigurable antenna and transmitting or receiving a second signal component via a second reconfigurable antenna, and at a second time allocation, transmitting or receiving the second signal component via the first reconfigurable antenna and transmitting or receiving the first signal component via the second reconfigurable antenna. In some embodiments, the first signal component is a first component of a multiple-input-multiple-output (MIMO) signal, and the second signal component is a second component of the MIMO signal. In some embodiments, the method includes performing point-to-point communication with a remote device via the MIMO signal. In some embodiments, the method includes applying a rate-one complex-valued space-time block coding to the MIMO signal.

In some embodiments, the method includes determining a phase difference between the first signal component and a second signal component, and shifting a phase of the first signal component at the second antenna feed to regenerate the second signal component. In some embodiments, the first signal component includes a communication for a first remote device, and wherein the second signal component includes communication for a second remote device. In some embodiments, the method includes allocating a first power level to the first beam, and allocating a second power level to the second beam. In some embodiments, processing the signal includes down-converting the signal when the signal is received from a remote device, or up-converting the signal when the signal is to be sent to remote device. In some embodiments, the method includes routing the signal between the radio frequency chain and at least one additional antenna feed to generate an additional beam in an additional direction.

In an embodiment, a method includes processing a first signal at a radio frequency chain to generate a first modulated signal. The method further includes routing the first modulated signal from the radio frequency chain to a first antenna feed of a reconfigurable antenna to generate a first beam in a first direction, while simultaneously routing the first modulated signal from the radio frequency chain to a second antenna feed of the reconfigurable antenna to generate a second beam in a second direction. The method also includes determining a phase difference between the first signal and a second signal. The method includes shifting a phase of the first modulated signal at the second antenna feed to generate a second modulate signal corresponding to the second signal, wherein the first modulated signal is transmitted via the first beam and the second modulated signal is transmitted via the second beam.

In some embodiments, the first signal includes a communication for a first remote device, and the second signal includes communication for a second remote device. In some embodiments, the method includes allocating a first power level to the first beam, and allocating a second power level to the second beam.

Figure 1:
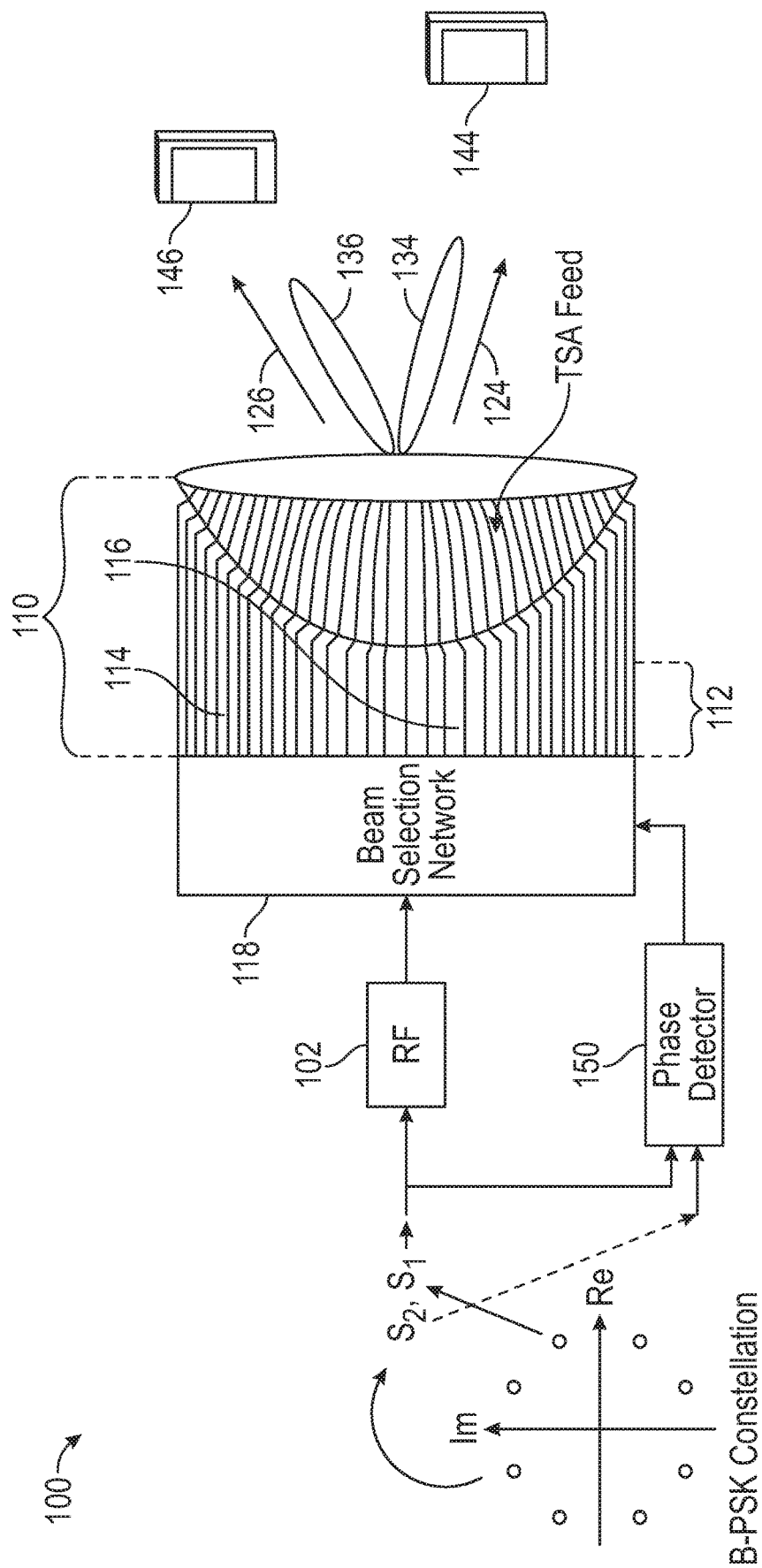
FIG. 1 is a block diagram depicting an embodiment of a system for reconfigurable antenna multiple access communication with partial channel state information.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of a system 100 for reconfigurable antenna multiple access communication with partial channel state information is depicted. The system 100 may be useable to suppress inter-user interference by transmitting only the intended signal for each user at the same time, frequency, or code block. A first signal S1 may be intended for a first remote user device 144, and a second signal S2 may be intended for a second remote user device 146. In some embodiments, as shown in FIG. 1, the signals S1 and S2 may be drawn from a phase shift keying (PSK) constellation where S2 may be expressed in terms of a phase shift of S1.

The system 100 may include a radio frequency chain 102, a beam selection network 118, a reconfigurable antenna 110, and a phase detector 150. The radio frequency chain 102 may be configured to down-convert a signal when the signal is received from a remote device, or up-convert the signal when the signal is to be sent to the remote device. The radio frequency chain 102 may include any number of devices and components that encode or decode a signal transmitted via airborne electromagnetic radiation. As used herein, a single radio frequency chain includes elements that convert a single electronic signal, or a single multiplexed electronic signal, to a carrier wave signal suitable for airborne transmission, or that down converts a single carrier wave signal received at an antenna to a single electronic signal, or a single multiplexed electronic signal. However, a single radio frequency chain 102 excludes additional elements that may up-convert or down-convert additional electronic signals, or additional multiplexed signals, to other carrier wave signals. As described further herein, a benefit of the system 100 is that multiple signals may be transmitted to multiple devices using a single radio frequency chain 102.

The reconfigurable antenna 110 may include multiple antenna feeds 112. For example, the multiple antenna feeds 112 may include a first antenna feed 114 and a second antenna feed 116. Each of the multiple antenna feeds 112 may be associated with a particular beam direction. For example, the first antenna feed 114 may be associated with a first beam direction 124 and the second antenna feed 116 may be associated with a second beam direction 126. As such, the reconfigurable antenna 110 may be capable of forming multiple beams in multiple directions. Example embodiments of the reconfigurable antenna 110 are described further herein.

During operation, the radio frequency chain 102 may be configured to process (e.g., up-convert/down-convert) a signal (e.g., the signal S1). The beam selection network 118 may be configured to selectively couple the radio frequency chain 102 to the first antenna feed 114 and the second antenna feed 116 simultaneously. By coupling the radio frequency chain 102 to the antenna feeds 114, 116, a first beam 134 is generated in the first beam direction 124 and a second beam 136 is generated in the second beam direction 126.

The phase detector 150 may be configured to determine a phase difference between the first signal S1 and the second signal S2. Further, each of the antenna feeds 112 of the reconfigurable antenna 110 may be independently controllable to modify a phase of a received signal component. As one example, each antenna feed may include a phase shifter circuit (not shown). Other methods of modifying a phase of a signal component may also be used, as would be appreciated by persons of ordinary skill in the art, having the benefit of this disclosure.

The first signal S1 may be applied to the first antenna feed 114 and may be transmitted unchanged to a first remote user device 144 via the first beam 134. The first signal S1 may also be applied to the second antenna feed 116. The phase detector 150 may send an indication of the phase difference between the first signal S1 and the second signal S2 to the beam selection network 118. The second antenna feed 116 may then shift the phase of the first signal S1 at the second antenna feed 116 to regenerate the second signal S2 from the first signal S1. The regenerated second signal S2 may be transmitted to a second remote user device 146 via the second beam 136.

The first signal S1 may include a communication for the first remote user device 144, and the second signal may include a communication for the second remote user device 146. The radio frequency chain 102 may be configured to down-convert a signal when the signal is received from one of the remote user devices 144, 146, or up-convert the signal when the signal is to be sent to one of the remote user devices 144, 146.

A benefit of the system 100 is that it enables multiple access communications using a single radio frequency chain. By only upconverting one of the signals (e.g., signal S1), system resources, such as power, may be conserved and additional hardware associated with additional radio frequency chains may be omitted. Other advantages may exist.

Figure 2:
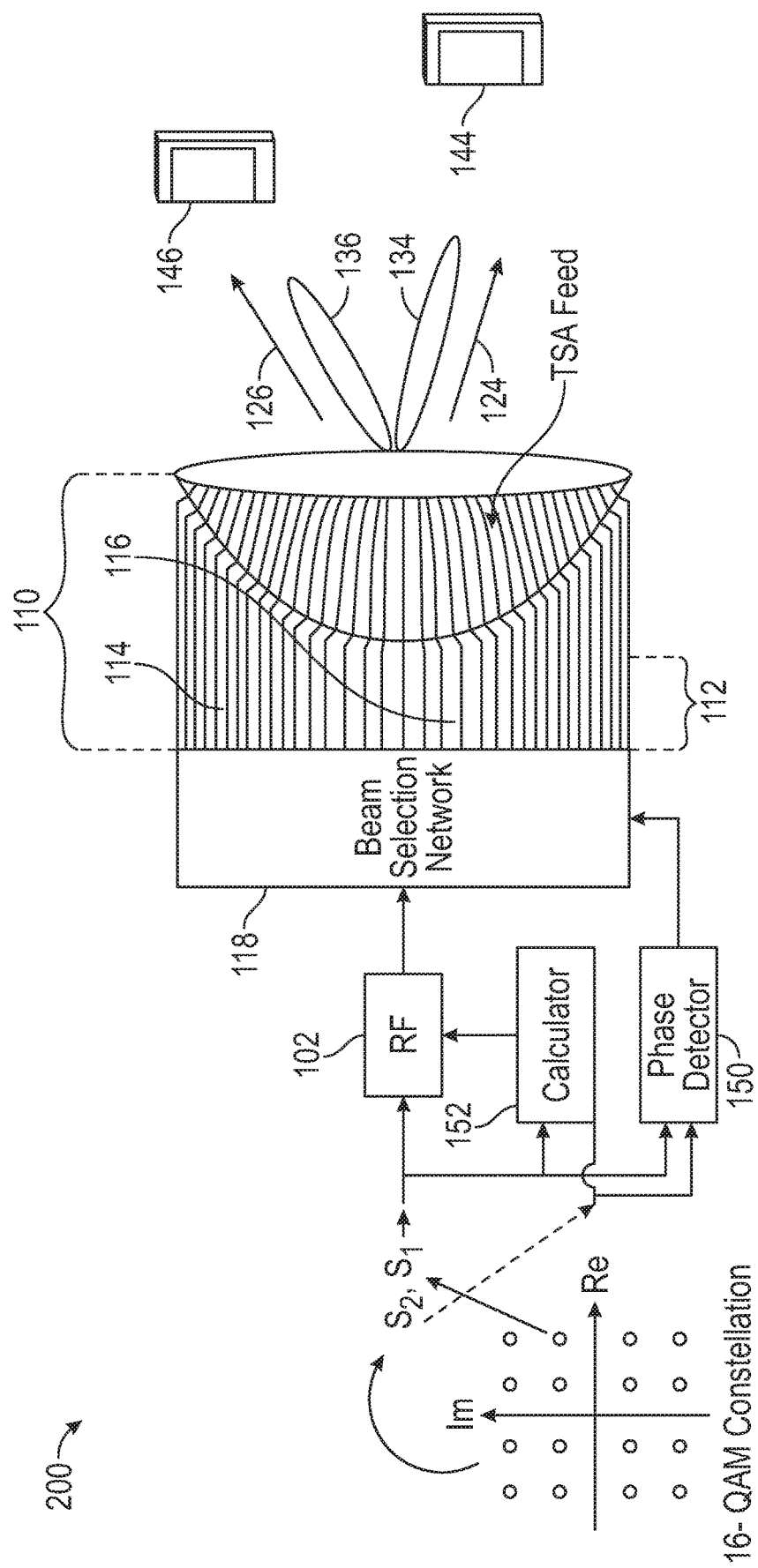
FIG. 2 is a block diagram depicting an embodiment of a system for reconfigurable antenna multiple access communication with full channel state information.

Referring to FIG. 2, an embodiment of a system 200 for reconfigurable antenna multiple access communication with full channel state information is depicted. In the embodiment of FIG. 2, the beam selection network 118 may be configured to select a power level associated with each of the multiple antenna feeds 112. As such, unlike the embodiment of FIG. 1, the system 200 may allocate power unevenly among radiation beams 134, 136 generated by the reconfigurable antenna 110.

The system 200 may further include a processing circuit 152. The processing circuit 152 may be configured to allocate a first power level to the first beam 134 and a second power level to the second beam 136. The processing circuit 152 may include any logic circuitry or processor, such as a microprocessor, with associated software to perform control functions, as described herein. For example, in some embodiments the processing circuit 152 may include a central processing unit (CPU), a graphical processing unit (GPU), a digital signal processor (DSP), a peripheral interface controller (PIC), another type of microprocessor, and/or combinations thereof. It may be implemented as an integrated circuit, a field programmable gate array (FPGA), an application specific integrated circuit (ASIC), a combination of logic gate circuitry, other types of digital or analog electrical design components, or combinations thereof.

During operation, the signal S1 may be processed by the radio frequency chain 102 and routed to the first antenna feed 114 and the second antenna feed 116 to generate the first beam 134 and the second beam 136, respectively. The first beam 134 may be associated with a first power level according to a power allocation strategy while the second beam 136 may be associated with a second power level. The first beam 134 may radiate in a first beam direction 124 for communication with a first remote user device 144. The second beam 136 may radiate in a second beam direction 126 for communication with a second remote user device 146.

Figure 3:
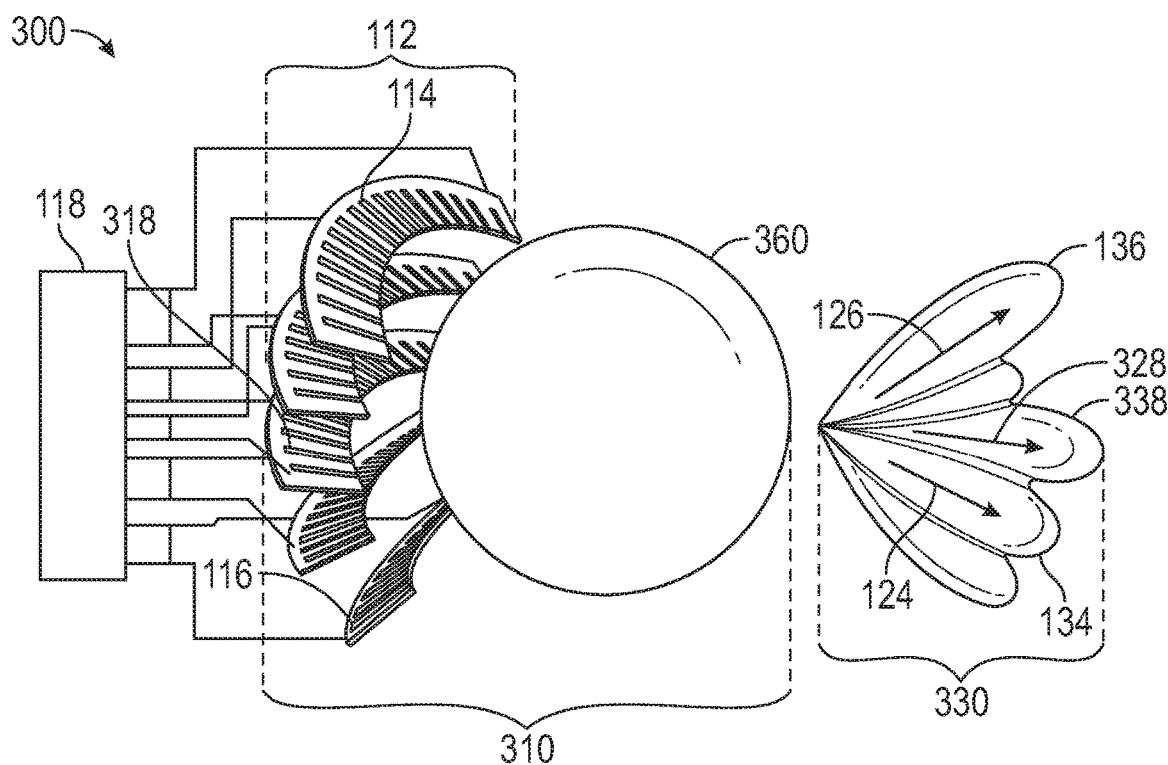
FIG. 3 is a diagram depicting an embodiment of a reconfigurable antenna for use with a system for reconfigurable antenna multiple access communication.

Referring to FIG. 3, an embodiment of a reconfigurable antenna 310 for use with a system 300 for reconfigurable antenna multiple access communication is depicted. The reconfigurable antenna 310 may correspond to the reconfigurable antenna 110. As shown in FIG. 3, the multiple antenna feeds 112 may be tapered slot antenna feeds. The antenna reconfigurable 310 may further include a spherical dielectric lens 360 coupled to the antenna feeds 112. The combination of the antenna feeds 112 and the spherical dielectric lens 360 may produce highly directive beams in far fields. The reconfigurable antenna 310 may be capable of generating a radiation pattern 330 having many different beams in different directions depending on the number of antenna feeds 112.

As depicted in FIG. 3, the beam selection network 118 may couple a radio frequency chain (as shown in FIGS. 1 and 2) to the first antenna feed 114 to form the first beam 134 in the first beam direction 124 and couple the radio frequency chain to the second antenna feed 116 to form the second beam 136 in the second beam direction 126. Further, since any number of beams may be generated, the beam selection network 118 may be further configured to couple the radio frequency chain to at least one additional antenna feed 318 of the multiple antenna feeds 112 to generate at least one additional beam 338 in an additional direction 328. As shown in FIG. 3, the radiation pattern 330 may include additional beams as well. The beam selection network 118 may allocate power equally among the selected beams, or, in some embodiments, the beam selection network 118 may be capable of allocating unequal power to selected antenna feeds 114, 116, 318 of the multiple antenna feeds 112.

Figure 4:
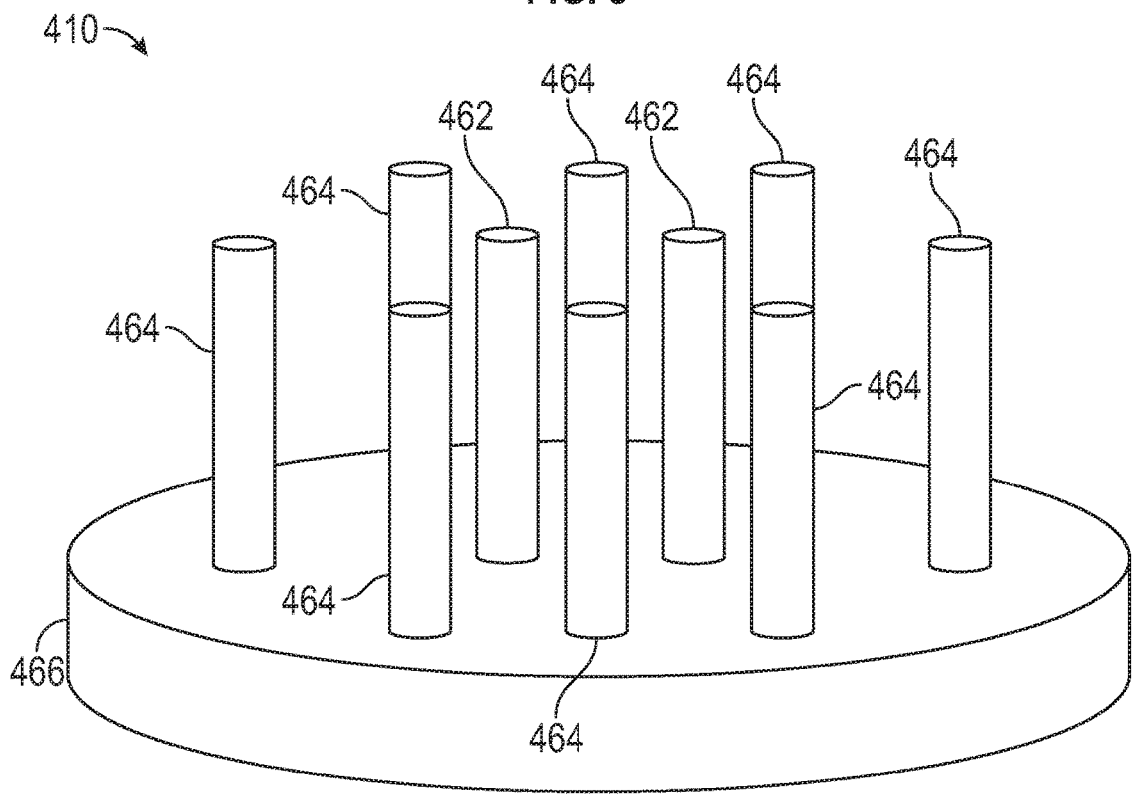
FIG. 4 is a diagram depicting an embodiment of a reconfigurable antenna for use with a system for reconfigurable antenna multiple access communication.

Referring to FIG. 4, an embodiment of a reconfigurable antenna 410 for use with a system for reconfigurable antenna multiple access communication is depicted. The reconfigurable antenna 410 may correspond to the reconfigurable antenna 110. The reconfigurable antenna 410 may include a plurality of active antenna elements 462 and a plurality of passive antenna elements 464 attached to a base or substrate 466. An embodiment of the reconfigurable antenna 110 is further describe with reference to U.S. Pat. No. 9,917,365 filed on Mar. 13, 2018 and entitled "Reconfigurable Antennas for Millimeter-Wave Systems that Support Multiple Beams", the contents of which are hereby incorporated by reference herein in its entirety.

Figure 5B:
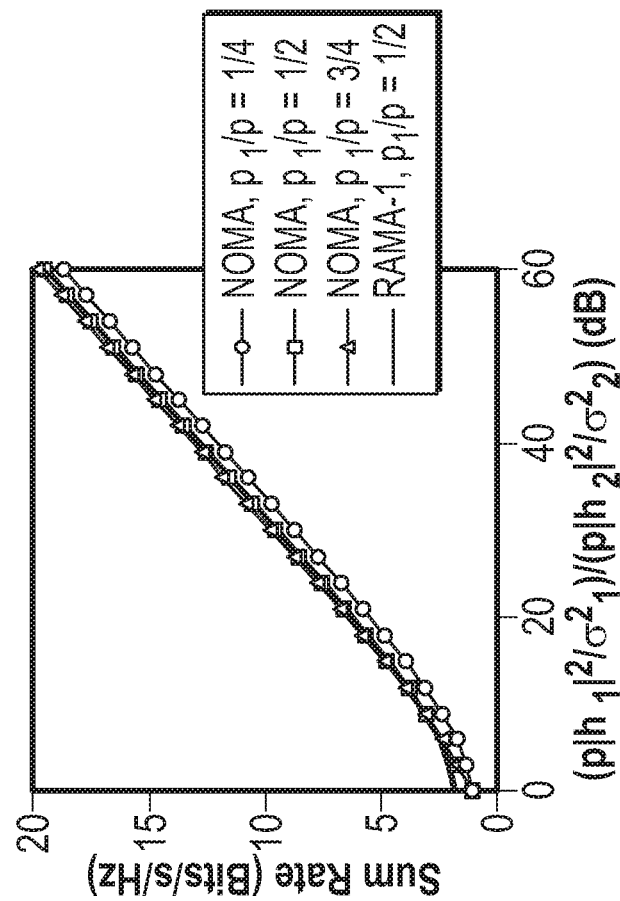
FIGS. 5A and 5B are charts depicting sum rate comparisons between a reconfigurable antenna multiple access system and typical non-orthogonal multiple access systems.
Figure 5A:
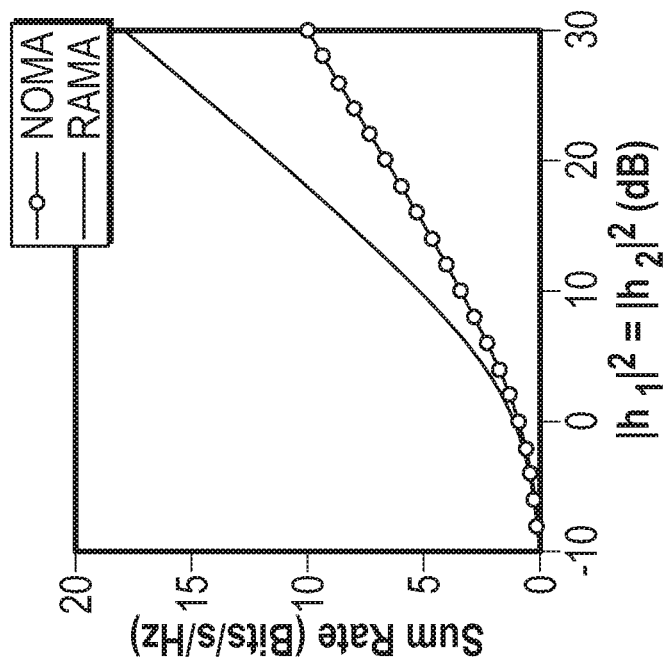

FIGS. 5A and 5B depict sum rate comparisons between the disclosed reconfigurable antenna multiple access system and typical non-orthogonal multiple access systems. As can be seen in FIG. 5A, at symmetric channels, the interference in non-orthogonal multiple access systems may reduce the sum rate, leading to a considerable gap compared to the reconfigurable antenna multiple access system described herein. As such, the disclosed reconfigurable antenna multiple access system may outperform typical non-orthogonal multiple access systems with symmetric channels. FIG. 5B shows asymmetric channel sum rate comparisons between a reconfigurable antenna multiple access system configured with $p_1/p=1/2$ (where $p_1$ is the power allocated to a first beam direction and p is the total power) and various configurations (e.g., $p_1/p=1/2$, $p_1/p=1/4$, $p_1/p=3/4$) of a non-orthogonal multiple access system, where $p_1$ is the power allocated to a first user device. With respect to FIG. 5A, power may be allocated equally between each of two user devices (e.g., $p_1=p_2$). As seen in FIG. 5B, for small values of $(p|h_1|^2/\sigma^2_1)/(p|h_2|^2/\sigma^2_2)$, the disclosed reconfigurable antenna multiple access system outperforms typical non-orthogonal multiple access systems, where $h_1$ is the complex channel gain, $\sigma^2_1$ is the noise power in a first channel, and $\sigma^2_2$ is the noise power in a second channel. For $p_1/p=\frac{3}{4}$ and a large channel gain difference, non-orthogonal multiple access systems may allocate more power to a single user which can nearly achieve a maximum sum rate. However, overall the disclosed reconfigurable antenna multiple access system outperforms typical non-orthogonal multiple access systems.

Figure 6B:
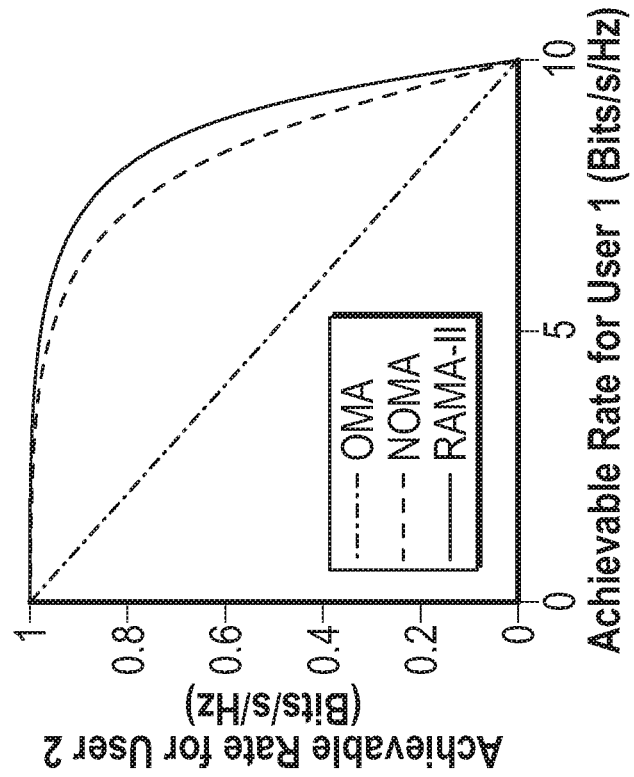
FIGS. 6A and 6B are charts depicting achievable rate comparisons between orthogonal multiple access systems, non-orthogonal multiple access systems, and a reconfigurable antenna multiple access system.
Figure 6A:
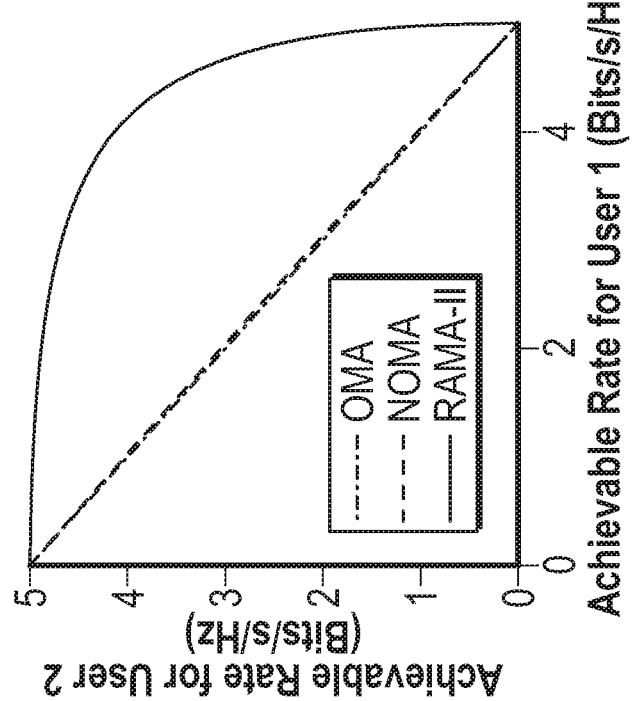

Referring to FIGS. 6A and 6B, an achievable rate comparison between orthogonal multiple access systems, non-orthogonal multiple access systems, and the disclosed reconfigurable antenna multiple access system is depicted for one of two users. FIG. 6A depicts an achievable rate region for a symmetric channel with $p|h_i|^2/\sigma^2_i=15$ dB for i=1, 2. FIG. 6B depicts an achievable rate region for an asymmetric channel with $p|h_1|^2/\sigma^2|=30$ dB and $p|h_2|^2/\sigma^2_2=0$ dB. As shown in FIGS. 6A and 6B, the achievable rate region for the disclosed reconfigurable multiple access system is greater than that for typical orthogonal multiple access systems and non-orthogonal multiple access systems.

Figure 7:
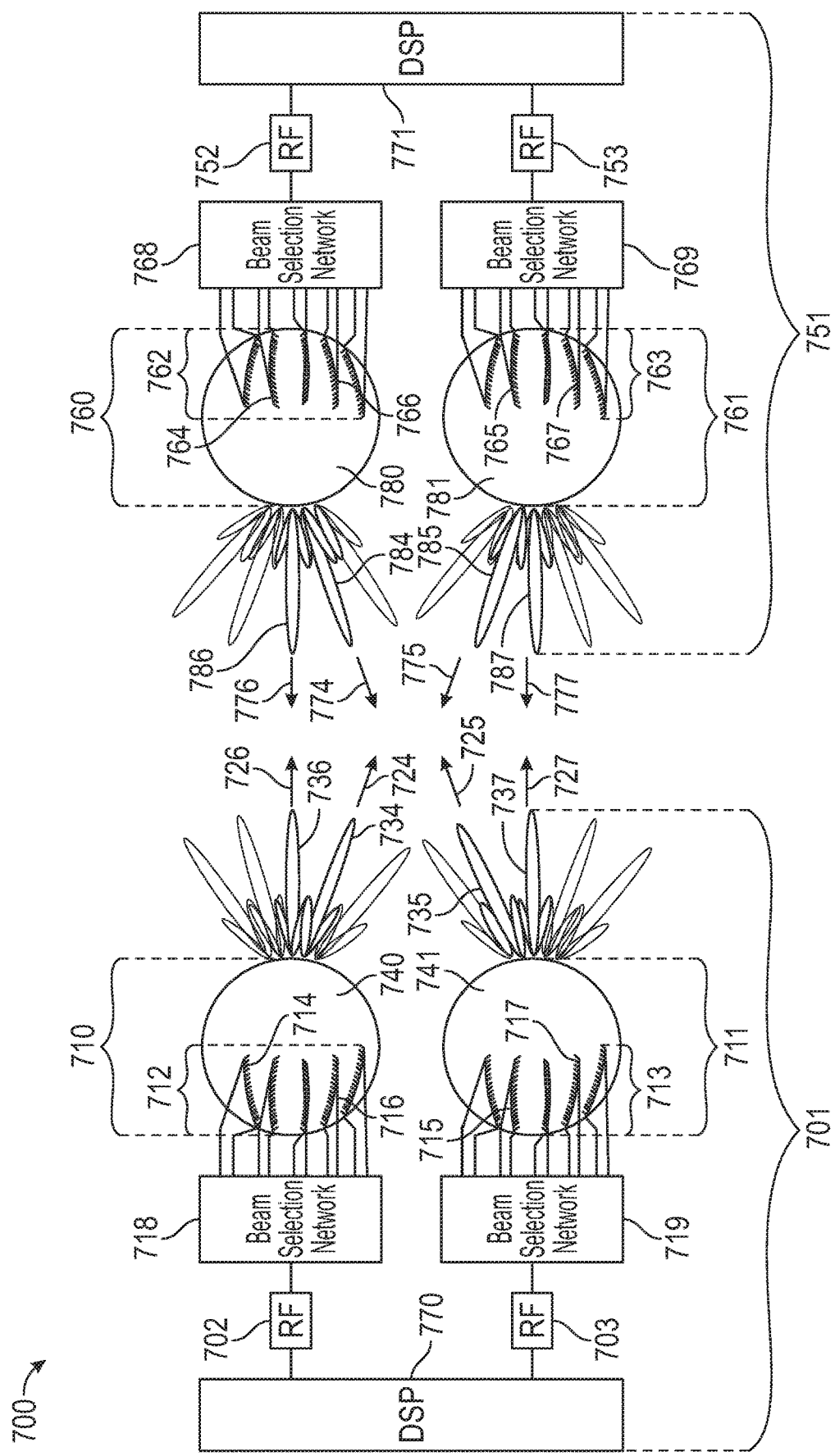
FIG. 7 is a block diagram depicting an embodiment of a system for multiple-input-multiple-output communication.

Referring to FIG. 7, an embodiment of a system 700 for multiple-input-multiple-output (MIMO) communication is depicted. The system 700 may include a first device 701 and a second device 751. The first device 701 may include a processor 770, e.g., a digital signal processor (DSP), a first radio frequency chain 702, and a second radio frequency chain 703. The first radio frequency chain 702 may drive a first reconfigurable antenna 710. The first reconfigurable antenna 710 may include multiple antenna feeds 712, e.g., tapered slot antenna feeds, such as a first antenna feed 714 and a second antenna feed 716. The first reconfigurable antenna 710 may further include a spherical dielectric lens 740. The first device 701 may also include a first beam selection network 718 configured to selectively couple the first radio frequency chain 702 to the multiple antenna feeds 712.

The second radio frequency chain 703 may drive a second reconfigurable antenna 711. The second reconfigurable antenna 711 may include multiple antenna feeds 713, e.g., tapered slot antenna feeds, such as a third antenna feed 715 and a fourth antenna feed 717. The second reconfigurable antenna 711 may further include a spherical dielectric lens 741. The first device 701 may also include a second beam selection network 719 configured to selectively couple the second radio frequency chain 703 to the multiple antenna feeds 713.

Likewise, the second device 751 may include a second processor 771, e.g., a DSP, a third radio frequency chain 752, and a fourth radio frequency chain 753. The third radio frequency chain 752 may drive a third reconfigurable antenna 760. The third reconfigurable antenna 760 may include multiple antenna feeds 762, e.g., tapered slot antenna feeds, such as a fifth antenna feed 764 and a sixth antenna feed 766. The third reconfigurable antenna 760 may further include a third spherical dielectric lens 780. The second device 751 may also include a third beam selection network 768 configured to selectively couple the third radio frequency chain 752 to the multiple antenna feeds 762.

The fourth radio frequency chain 753 may drive a fourth reconfigurable antenna 761. The fourth reconfigurable antenna 761 may include multiple antenna feeds 763, e.g., tapered slot antenna feeds, such as a seventh antenna feed 765 and an eighth antenna feed 767. The fourth reconfigurable antenna 761 may further include a fourth spherical dielectric lens 781. The second device 751 may also include a fourth beam selection network 769 configured to selectively couple the fourth radio frequency chain 753 to the multiple antenna feeds 763.

During operation, the first radio frequency chain 702 may be used to process a signal. A first signal component may be routed by the first beam selection network 718 between the first radio frequency chain 702 and the first antenna feed 714 to generate a first beam 734 in a first beam direction 724. The first signal component may simultaneously be routed by the first beam selection network 718 between the first radio frequency chain 702 and the second antenna feed 716 to generate a second beam 736 in a second beam direction 726.

Likewise, the second radio frequency chain 703 may be used to process the signal. A second signal component may be routed by the second beam selection network 719 between the second radio frequency chain 703 and the third antenna feed 715 to generate a third beam 735 in a third beam direction 725. The second signal component may simultaneously be routed by the second beam selection network 719 between the second radio frequency chain 703 and the fourth antenna feed 717 to generate a fourth beam 737 in a fourth beam direction 727.

In this way, the first device 701 may perform MIMO communication. For example, at a first time allocation, the first signal component may be transmitted or received via the first reconfigurable antenna 710 and the second signal component may be transmitted or received via the second reconfigurable antenna 711. At a second time allocation, the second signal component may be transmitted or received via the first reconfigurable antenna 710 and the first signal component may be transmitted or received via the second reconfigurable antenna 711. The first signal component may be a first component of a MIMO signal, and the second signal component may be a second component of a MIMO signal. The processor 770 may be used to apply a rate-one complex-valued space-time block coding to the MIMO signal.

The system 700 may be configured to perform performing point-to-point communication between the devices 701, 751. For example, as described with reference to the first device 701, the second device 751 may likewise be configured to generate a fifth beam 784 in a fifth beam direction 774, generate a sixth beam 786 in a sixth beam direction 776, generate a seventh beam 785 in a seventh beam direction 775, and generate an eighth beam 787 in a fifth beam direction 777, and to transmit a MIMO signal.

Although not depicted in FIG. 7, each of the radio frequency chains 702, 703, 752, 753 may be associated with a phase detector, such as the phase detector 150, and/or a processor, such as the processor 152 as described with reference to FIGS. 1 and 2. This may enable the first device 701 and/or the second device 751 to conduct MIMO communication with multiple remote devices, as would be appreciated by persons of ordinary skill in the art having the benefit of this disclosure.

A benefit of the system 700 is that MIMO communications may be performed using a single radio frequency chain per reconfigurable antenna 710. Further, multiple access MIMO may be enabled. This may enable a simpler design and fewer hardware components as compared to typical MIMO communication devices. Other advantages may exist.

Figure 8:
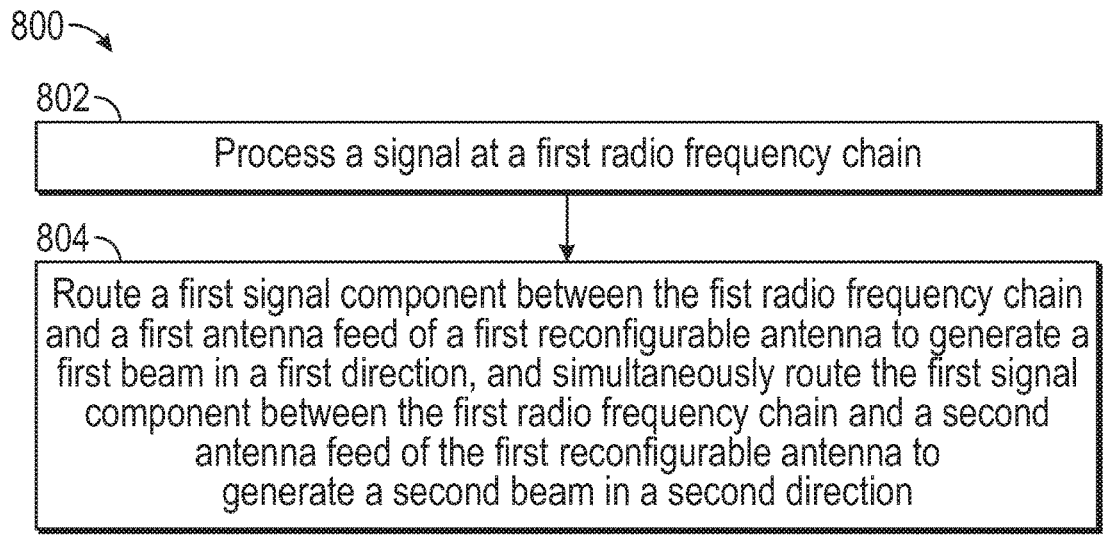
FIG. 8 is a flow chart depicting a method for reconfigurable antenna multiple access communication.

Referring to FIG. 8, a method 800 for reconfigurable antenna multiple access communication is depicted. The method 800 may include processing a signal at a first radio frequency chain, at 802. For example, the signal S1 may be processed at the radio frequency chain 102. As another example, a signal may be processed at the radio frequency chain 702.

The method 800 may further include routing a first signal component between the first radio frequency chain and a first antenna feed of a first reconfigurable antenna to generate a first beam in a first direction, and simultaneously routing the first signal component between the first radio frequency chain and a second antenna feed of the first reconfigurable antenna to generate a second beam in a second direction, at 804. For example, a first signal component may be routed between the radio frequency chain 102 and the first antenna feed 114 to generate the first beam 134 in the first beam direction 124. Simultaneously, the first signal component may be routed between the radio frequency chain 102 and the second antenna feed 116 to generate the second beam 136 in the second direction 126. Likewise, a first signal component may be routed between the first radio frequency chain 702 and the first antenna feed 714, while the first signal component is simultaneously routed between the first radio frequency chain 702 and the second antenna feed 716.

A benefit of the method 800 is that multiple access communication may be enabled using a reconfigurable antenna coupled to a single radio frequency chain. Further, MIMO communication may also be achieved by adding one or more additional radio frequency chains with a corresponding reconfigurable antenna (e.g., the second radio frequency chain 703 and the second reconfigurable antenna 711. Other advantages may exist.

Figure 9:
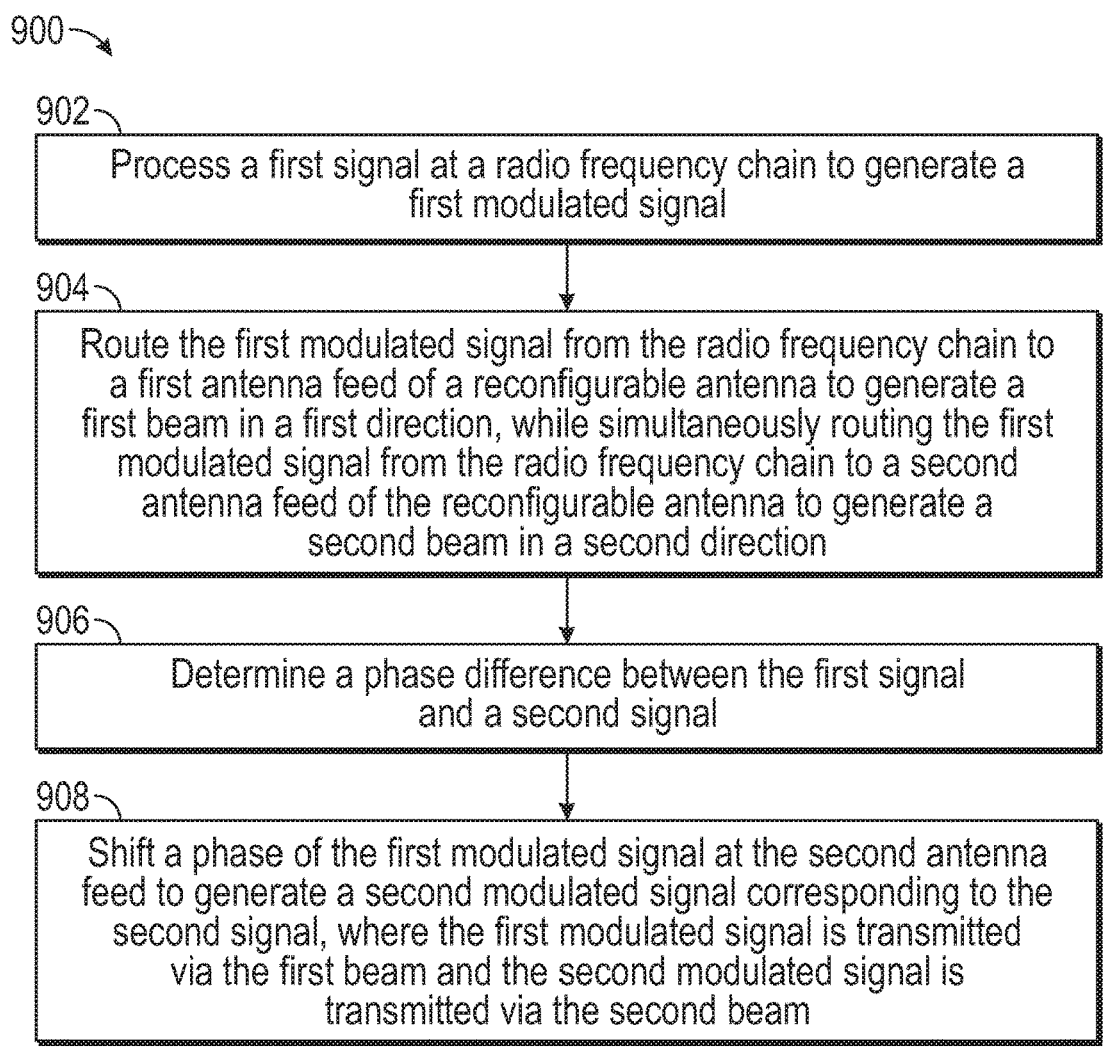
FIG. 9 is a flow chart depicting a method for reconfigurable antenna multiple access communication.

Referring to FIG. 9, a method 900 for reconfigurable antenna multiple access communication is depicted. The method 900 may include processing a first signal at a radio frequency chain to generate a first modulated signal, at 902. For example, the signal S1 may be processed at the radio frequency chain 102 to produce a first modulated signal.

The method 900 may further include routing the first modulated signal from the radio frequency chain to a first antenna feed of a reconfigurable antenna to generate a first beam in a first direction, while simultaneously routing the first modulated signal from the radio frequency chain to a second antenna feed of the reconfigurable antenna to generate a second beam in a second direction, at 904. For example, the beam selection network 118 may route the modulated signal simultaneously to the first antenna feed 114 and the second antenna feed 116.

The method 900 may also include determining a phase difference between the first signal and a second signal, at 906. For example, the phase detector 150 may determine a phase difference between the first signal S1 and the second signal S2.

The method 900 may include shifting a phase of the first modulated signal at the second antenna feed to generate a second modulated signal corresponding to the second signal, where the first modulated signal is transmitted via the first beam and the second modulated signal is transmitted via the second beam, at 908. For example, the phase of the first modulated signal may be shifted at the second antenna feed 116 to generate a second modulated signal that corresponds to the second signal S2.

A benefit of the method 900 is that multiple access communication may be enabled using a reconfigurable antenna coupled to a single radio frequency chain, which may result in fewer circuitry and less complexity than a typical non-orthogonal multiple access system. Other advantages may exist.

Although various embodiments have been shown and described, the present disclosure is not so limited and will be understood to include all such modifications and variations as would be apparent to one skilled in the art.

What is claimed is:

1. A method comprising:
   receiving a first signal for transmission to a first device and a second signal for transmission to a second device;
   processing a first signal component of the first signal at a first radio frequency chain;
   processing a second signal component of the first signal at a second radio frequency chain;
   determining a phase difference between the first signal component of the first signal and a first signal component of the second signal;
   determining a phase difference between the second signal component of the first signal and a second signal component of the second signal;
   routing the first signal component of the first signal between the first radio frequency chain and a first antenna feed of a first reconfigurable antenna to generate a first beam in a first direction, and simultaneously routing the first signal component of the first signal between the first radio frequency chain and a second antenna feed of the first reconfigurable antenna to generate a second beam in a second direction, wherein the second antenna feed of the first reconfigurable antenna is configured to shift a phase of the first signal component of the first signal based on the phase difference between the first signal component of the first signal and the first signal component of the second signal to regenerate the first signal component of the second signal for transmission; and
   routing the second signal component of the first signal between the second radio frequency chain and a first antenna feed of a second reconfigurable antenna to generate a third beam in a third direction, and simultaneously routing the second signal component of the first signal between the second radio frequency chain and a second antenna feed of the second reconfigurable antenna to generate a fourth beam in a fourth direction, wherein the second antenna feed of the second reconfigurable antenna is configured to shift a phase of the second signal component of the first signal based on the phase difference between the second signal component of the first signal and the first signal component of the second signal to regenerate the second signal component of the second signal for transmission.

2. The method of claim 1, further comprising:
   at a first time allocation, transmitting the first signal component of the first signal and the first signal component of the second signal via the first reconfigurable antenna and transmitting the second signal component of the first signal and the second signal component of the second signal via the second reconfigurable antenna.

3. The method of claim 2, wherein the first signal is a first multiple-input-multiple-output (MIMO) signal, and the second signal is a second MIMO signal, the method further comprising:
   performing point-to-point communication with the first device via the first MIMO signal; and
   performing point-to-point communications with the second device via the second MIMO signal.

4. The method of claim 3, further comprising:
   applying a rate-one complex-valued space-time block coding to the first MIMO signal; and applying a rate-one complex-valued space-time block coding to the second MIMO signal.

5. The method of claim 1, further comprising:
allocating a first power level to the first beam; and
allocating a second power level to the second beam.

6. The method of claim 1, wherein processing the first signal component includes up-converting the first signal component.

* * * * *